United States Patent [19]

Keyser

[11] Patent Number: 5,082,209
[45] Date of Patent: Jan. 21, 1992

[54] THRUST REVERSER ASSEMBLY

[75] Inventor: Andrew G. Keyser, Delray Beach, Fla.

[73] Assignee: United Technologies Corporation, Hartford, Conn.

[21] Appl. No.: 662,645

[22] Filed: Mar. 1, 1991

[51] Int. Cl.⁵ .................. B63H 11/10; F02K 1/54
[52] U.S. Cl. .................. 244/110 B; 239/265.19; 239/265.25; 239/265.33; 60/228
[58] Field of Search ............... 244/110 B, 12.5; 60/232, 228, 226.2, 230; 239/265.31, 265.29, 265.25, 265.33, 265.19

[56] References Cited

U.S. PATENT DOCUMENTS

| | | | |
|---|---|---|---|
| 2,575,735 | 11/1951 | Servanty | 239/265.33 X |
| 2,964,905 | 12/1960 | Hewson et al. | 60/35.54 |
| 3,380,661 | 4/1968 | Markowski | 239/265.29 |
| 4,463,921 | 8/1984 | Metz | 239/265.31 X |
| 4,552,309 | 11/1985 | Szuminski et al. | 244/110 B X |
| 4,564,160 | 1/1986 | Vermilye | 244/110 |

FOREIGN PATENT DOCUMENTS 1250277  9/1967  Fed. Rep. of Germany ... 244/110 B

Primary Examiner—Joseph F. Peters, Jr.
Assistant Examiner—Carla Mattix
Attorney, Agent, or Firm—Edward L. Kochey, Jr.

[57] ABSTRACT

Ports through the wall of the exhaust duct and the wall of the surrounding cooling air duct, connect the exhaust duct and reverse thrust ducts. Door sets seal these ports. The door sets are contrarotated around the exhaust duct providing a symmetrical opening of the ports.

7 Claims, 5 Drawing Sheets ns. These openings may be arranged
THRUST REVERSER ASSEMBLY The Government has rights in this invention pursuant to a contract awarded by the Department of the Air Force.

TECHNICAL FIELD

The invention relates to gas turbine engine aircraft and in particular to an assembly for activating reverse thrust gas discharge.

BACKGROUND OF THE INVENTION

Gas turbine engines on aircraft use the discharge force of gases for the thrust to drive the aircraft. Braking forces may be obtained after landing or during flight by reversing the direction of discharge.

Reverse thrust discharge involves a blockage of the rearward flow path plus transfer of the axial gas flow to a radial flow. The radial flow has a forward component producing the reverse thrust.

Various linkages and apparatus have been suggested to close the discharge, sometimes combined with the radial discharge. These generally have been relatively heavy. They have required linear actuation in locations tending to interfere with adjacent nozzle components.

Whatever structure is used to close the rear discharge, there is a need for a compact, simply actuatable, lightweight apparatus for closing and opening the radial reverser flow paths.

SUMMARY OF THE INVENTION

A gas turbine engine includes a circular inner wall forming a gas turbine exhaust duct for conveying the gas turbine exhaust gases. An outer wall concentric with this forms an annular coolant flow passage for conveying cooling air along the inner wall and rearward for cooling of the discharge nozzle and other components.

Outside this outer wall is a plurality of radially extending reverser ducts which provide a discharge of any gas passing through the duct with a forward component to effect thrust reversal. A plurality of radial port openings are located through the inner and outer walls connecting the exhaust duct with these reverser ducts.

A door set is located on each port opening with each door set having an inner door sized and sealable to close the door opening within the inner wall. It also has an outer door sized and sealable to close the same port opening through the outer wall.

Rotatable support rings are located upstream and downstream of the port openings, to which the door sets are secured. The door sets therefor may be circumferentially rotated to open positions away from the port openings. By simultaneously rotating one door set clockwise, and the other counterclockwise, symmetrical operation is achieved. This split ring assembly allows equal force distribution whether partially reversing or fully reversing.

The door sets are preferably arranged with thin door sets and thick door sets so that the thin door sets will nest within the thick door sets. With this arrangement the door sets may more effectively use a greater portion of the circumference for the port openings.

The support rings contain axial openings which permits cooling airflow from the annular space upstream of the door sets through the door sets and to the downstream annular space. These openings may be arranged so that the cooling airflow path is closed when the doors rotate to the open position.

DESCRIPTION OF THE PREFERRED EMBODIMENT

Figure 1:
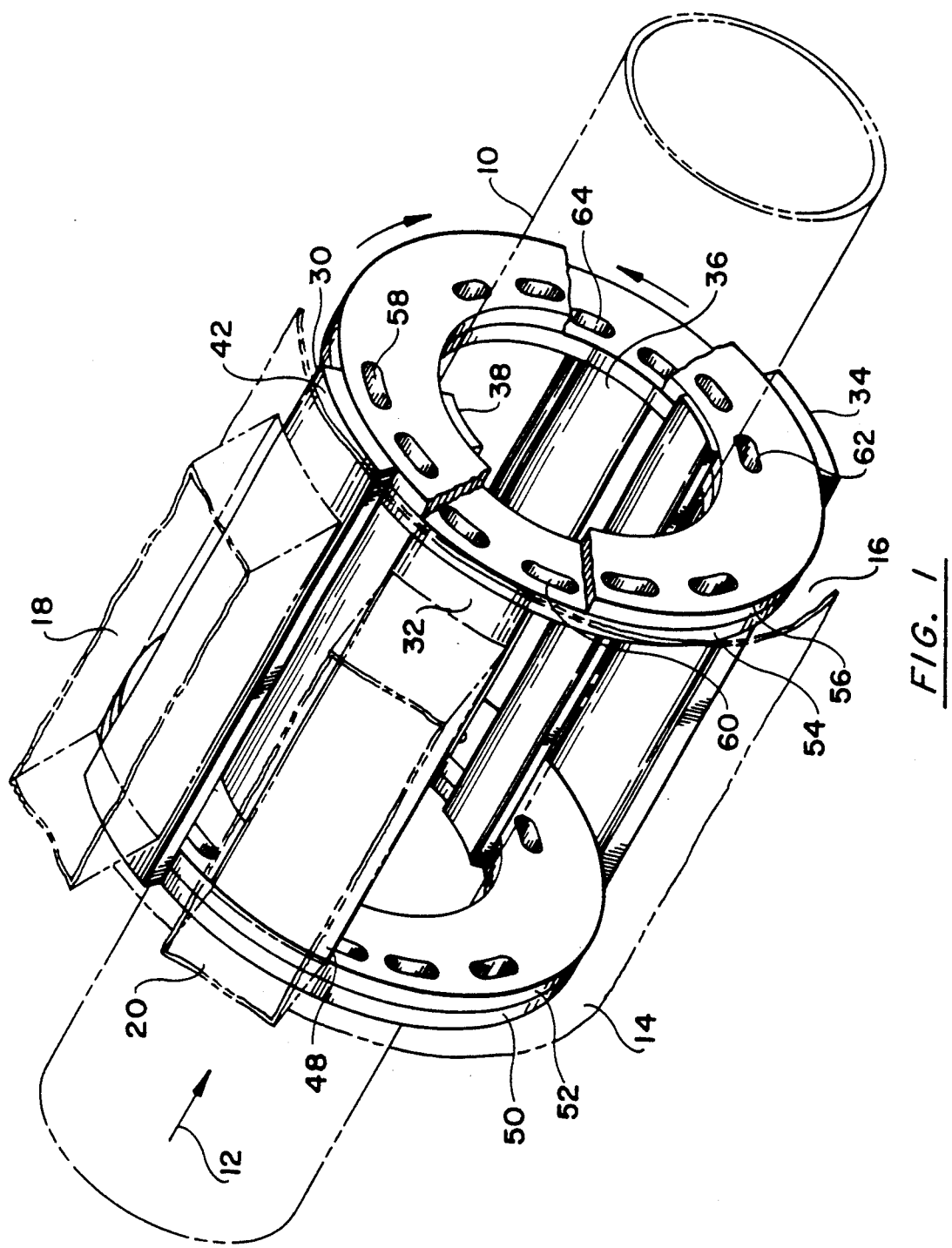
FIG. 1 is an isometric view of the thrust reverser apparatus.

Referring to FIG. 1 there is shown an inner wall 10 forming a circular gas turbine exhaust duct conveying a flow of exhaust gases 12 from an upstream location to a downstream location. During normal operation the gas discharges through a two dimensional exhaust nozzle, not shown.

A concentric outer wall 14 forms an annular coolant flow passage 16 through which pressurized air as a coolant passes for the purpose of cooling inner wall 10 and the convergent and divergent flaps located downstream.

Located outside the outer wall 14 are radially extending reverser ducts 18 and 20. The illustrated ducts are located at the top of the structure, and a similar pair of exhaust ducts (22, 24—FIG. 2) are located on the bottom of the structure. Associated with each radially extending reverser duct would be appropriate baffles or flow deflectors to further splay any gas flowing through the duct with a component toward the forward portion of the aircraft, whereby additional thrust reversing forces will be achieved. These ducts are symmetrically located around a vertical centerline (26) with the two illustrated ducts being closer to the top, that is these ducts are closer to the vertical centerline than they are to the horizontal centerline (28). Similarly, the two lower ducts (22, 24) are located close to the bottom.

Figure 2:
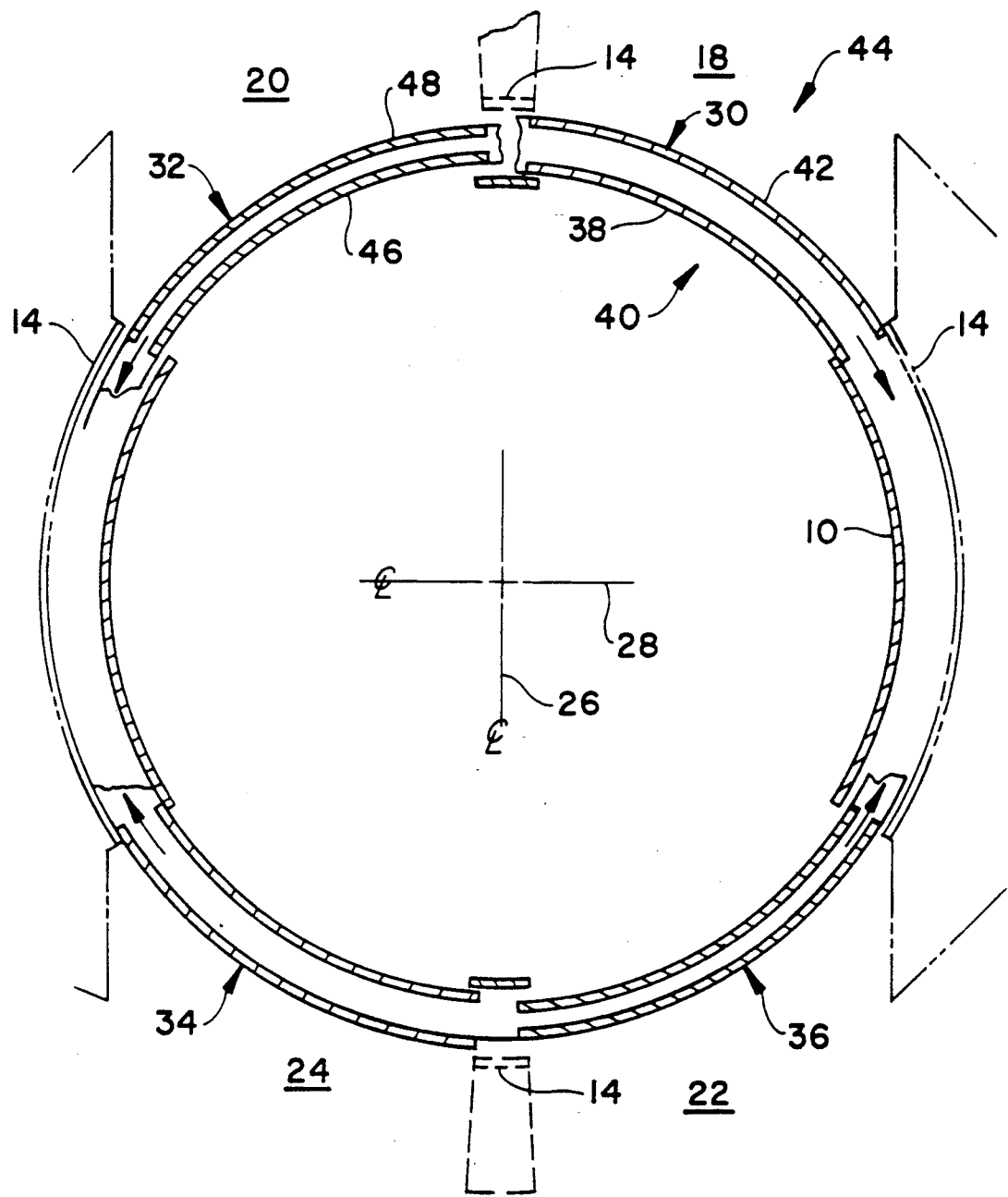
FIG. 2 is an axial view showing the doors in the closed position.

Referring also to FIG. 2, the closed position of door sets 30, 32, 34 and 36 are shown. Door set 30 is comprised of an inner door 38 sized and located to close a port opening 40 in inner wall 10 and an outer door 42 sized to close a port opening 44 in outer wall 14. In a similar manner door set 32 is comprised of an inner door 46 and and outer door 48.

Door set 32 is a thin door set with doors 46 and 48 located relatively close together Door set 30 on the other hand is a thick door set with doors 38 and 42 located farther apart. This spacing between doors of the thin door set and the thick door set are such that doors 46 and 48 of the thin door set will fit between doors 38 and 42 of the thick door set.

Figure 3:
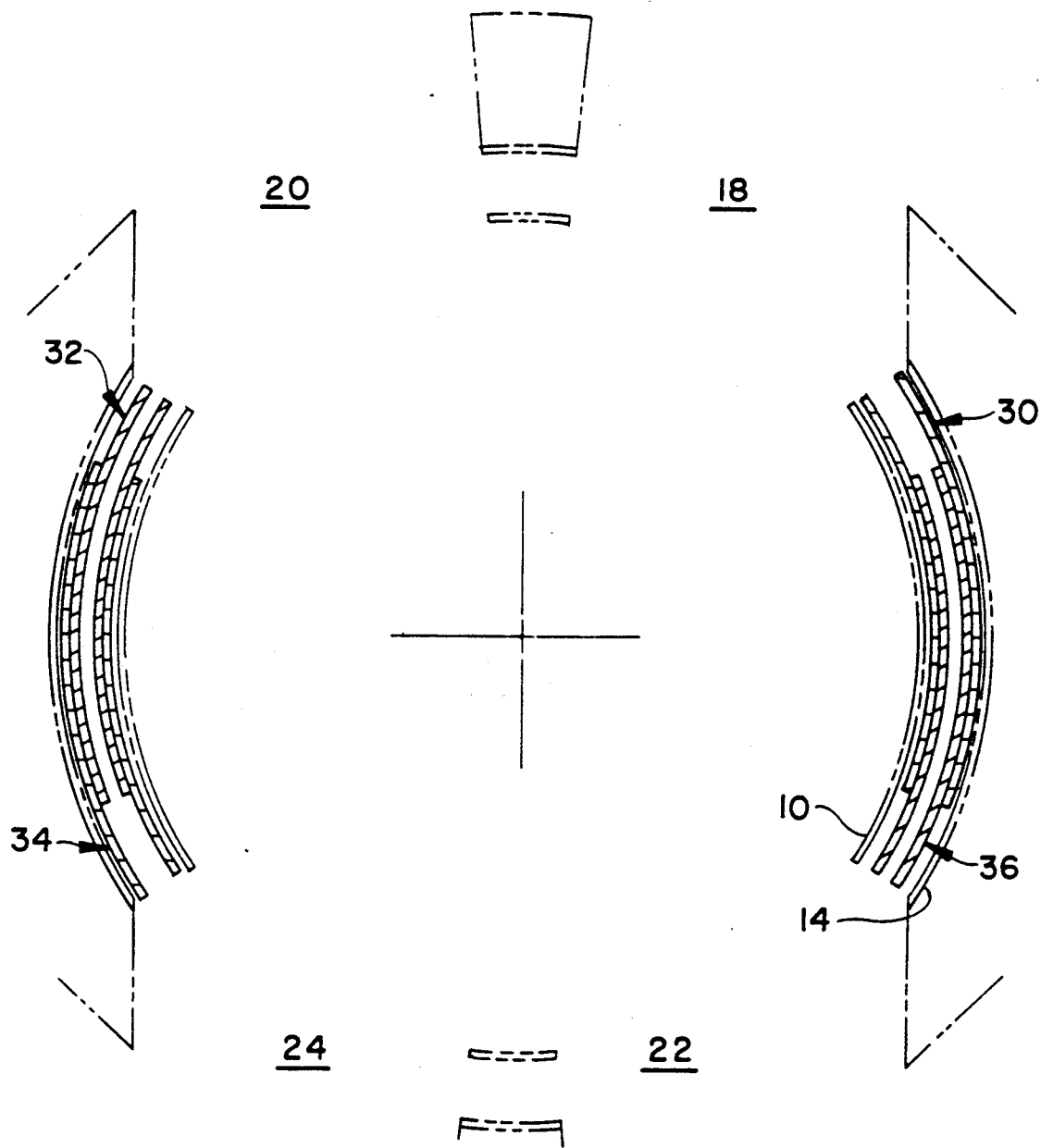
FIG. 3 is an axial view showing the doors in an open position.

FIG. 3 illustrates the doors rotated to the open or reversing position where the exhaust gas has access to the radial exhaust ducts 18-24. It can be seen that thin door set 32 nests within thick door set 34, and thin door set 36 nests within thick door set 30.

Figure 4:
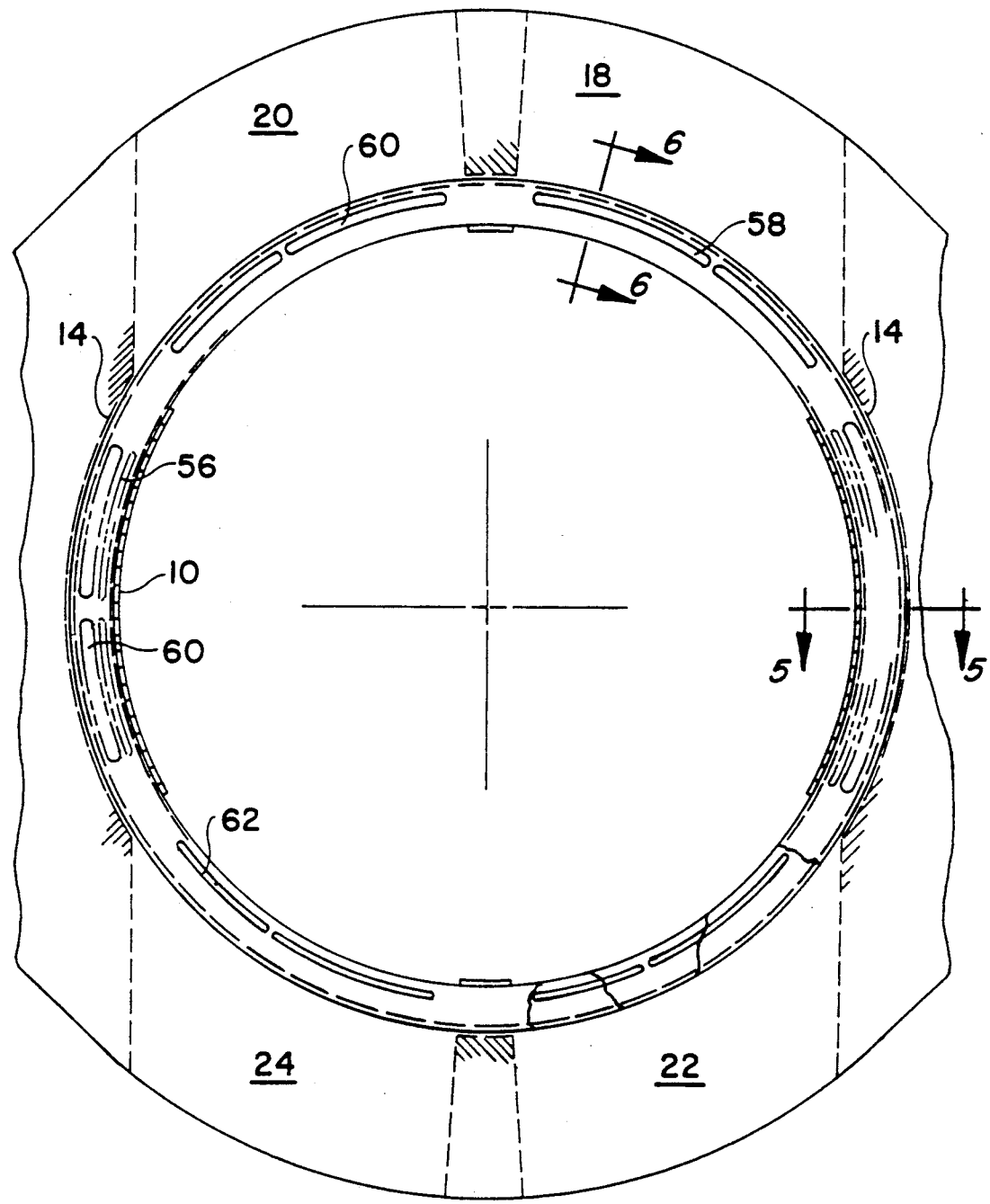
FIG. 4 is an axial view showing the support rings in the doors closed and doors open position.

FIG. 4 illustrates the coolant flow openings through the support rings in solid lines for the door closed position and in phantom for the door open position. These support rings themselves are more clearly seen in FIGS. 1, 5 and 6. Upstream of the radial port opening there is located an outboard support ring 50 and an inboard support ring 52. Downstream of the port opening there is located an inboard support ring 54 and an outboard support ring 56. The two outboard support rings 50 and 56 carry the doors of thick door sets 30 and 34. The inboard support rings 52 and 54 carry the doors of the thin door sets 32 and 36. It can be seen that with this arrangement, the support rings may be counter-rotated to move the door sets away from the openings and into a nested position.

With the doors in the closed position, axial openings 58 are located in the upper portion of the outboard rings at a first radius. The inboard ring has similar openings 60 at the same radius. Where the rings overlap there are openings in both rings so that these openings are contiguous, permitting the passage of the cooling flow through the annular space 16 to pass between the doors from an upstream location on to the downstream locations.

At the lower portion of the outboard support rings there are located axial flow openings 62 at a radius less than that at which the earlier discussed openings were located The inboard ring also has axial flow openings 64 located at the same radius. Where the rings overlap with the doors in the closed position the corresponding openings are contiguous to permit the passage of cooling air.

Referring to the phantom portion of FIG. 4 when the doors are rotated to the open position, flow opening 60 overlays a portion of support ring 56 which does not have openings and in this condition the flow openings through the corresponding inboard and outboard rings are noncontiguous. This blocks the cooling airflow from passing into the gas stream when the doors are open.

Figure 5:
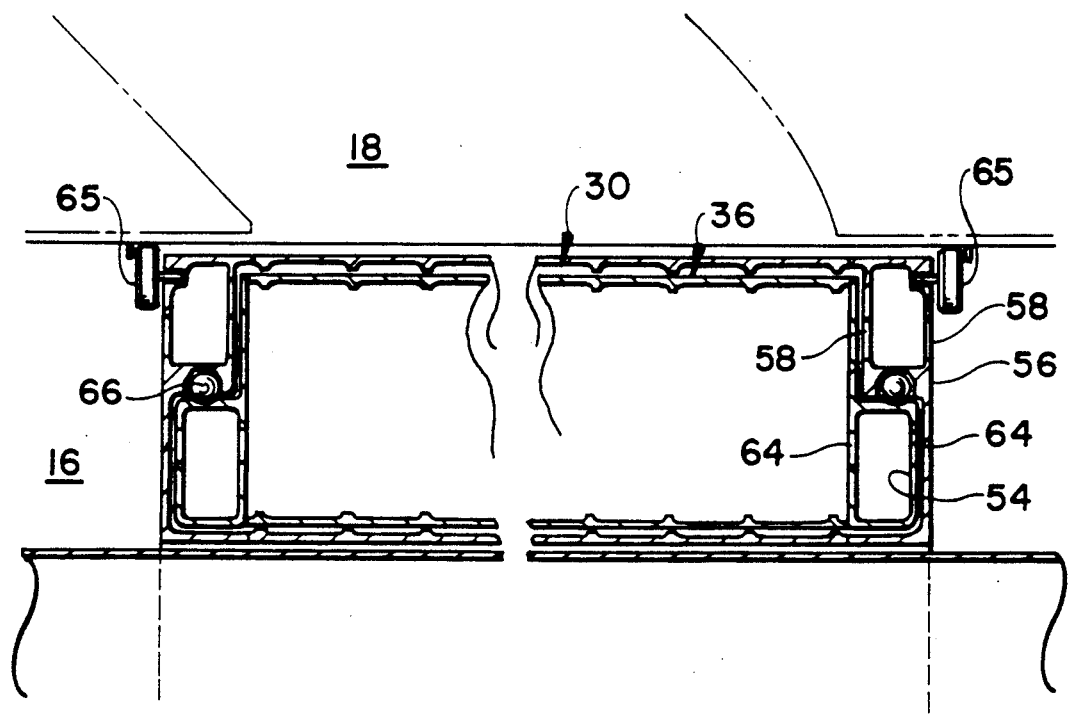
FIG. 5 is a section through the support rings in the door open position.

FIG. 5 is a section taken at 5—5 of FIG. 4 showing the doors in the open or nested position. Flow openings 60 in support ring 54 are not aligned with flow openings 62 in support ring 56. Cooling airflow is therefore blocked.

The outboard ring 56 is supported on rollers 64 to facilitate rotation of the support ring. Support ring 54 is supported through bearing 66 and support ring 56. Any one of various desired actuating methods may be used to rotate support ring 56 and contrarotate support ring 54.

Figure 6:
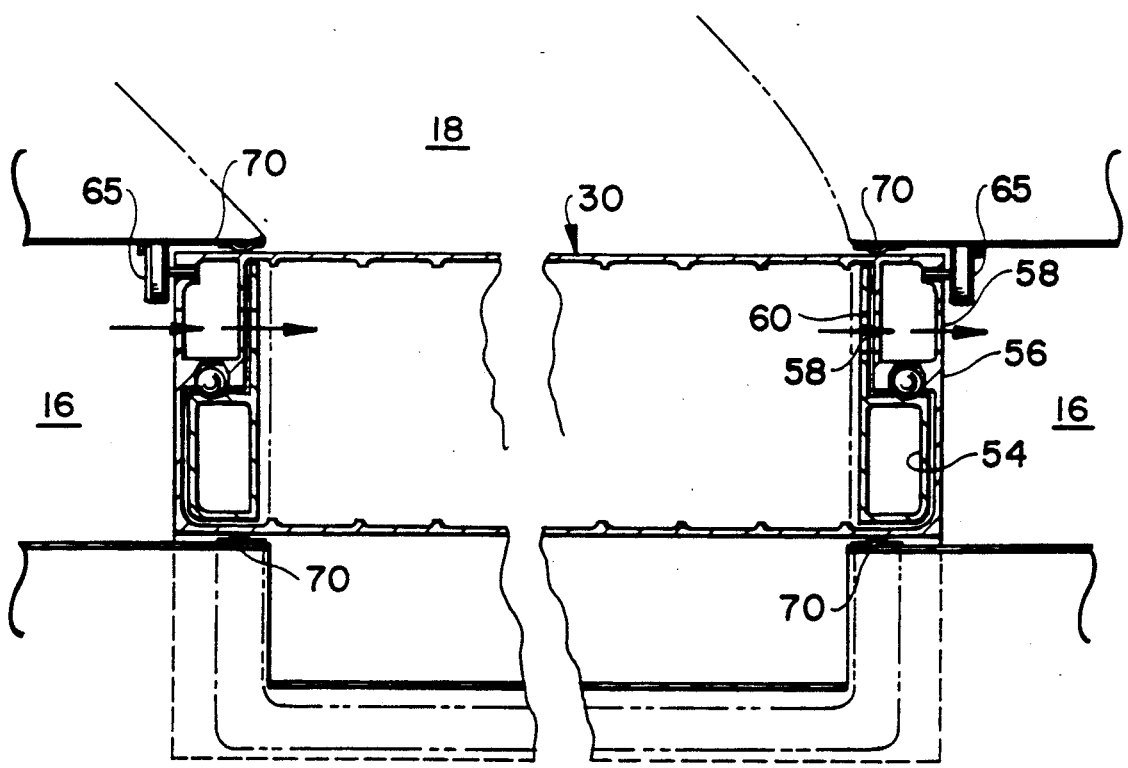
FIG. 6 is a section through the support rings in the door closed position.

FIG. 6 is a section taken through section 6—6 of FIG. 4 illustrating the closed or forward thrust position. It can be seen that the flow opening 60 of the outboard ring 56 are contiguous and in fluid communication with opening 60 in support ring 54.

Gas seals 70 are located to seal the doors in the port and it is apparent that the seals for the thin doors and the thick doors must be located at slightly different radial locations to account for the corresponding radii.

With the nesting of door sets increased flexibility in the location and sizing of the ports is achieved. Contrarotation of the door sets produces a symmetrical flow pattern avoiding roll of the aircraft. A compact, lightweight assembly may be easily actuated without interference with nearby components.

I claim:

1. A thrust reverser assembly for a gas turbine engine aircraft comprising:
   an inner wall forming a circular gas turbine exhaust duct;
   a concentric outer wall forming an annular coolant flow passage;
   a plurality of radially extending reverser ducts located outside said outer wall;
   a plurality of radial port openings through said inner and outer walls fluidly connecting said exhaust duct and said reverser ducts;
   a plurality of door sets located in said plurality of port openings, each door set having an inner door sized and sealable to close a port opening through said inner wall, and an outer door sized and sealable to close the same port opening through said outer wall;
   at least one rotatable upstream support ring circumferentially surrounding said inner wall upstream of said port opening;
   at least one rotatable downstream support ring circumferentially surrounding said inner wall downstream of said port opening; and
   each of said door sets secured to said at least one upstream support ring and to said at least one downstream support ring, whereby said door sets may each be circumferentially rotated away from the port opening in which they are sealable.

2. A thrust reverser assembly as in claim 1 further comprising:
   two rotatable upstream rings;
   two rotatable downstream rings;
   half of said plurality of door sets secured to one of said upstream rings and one of said downstream rings; and
   the other half of said plurality of door sets secured to the other of said upstream rings and the other of said downstream rings.

3. A thrust reverser assembly as in claim 2 further comprising:
   half of said plurality of door sets comprising thick door sets;
   the other half of said plurality of door sets comprising thin door sets, said thin door sets sized to fit between the inner and outer doors of said thick door sets;
   said two rotatable upstream rings comprising an outboard ring and an inboard ring;
   said two rotatable downstream rings comprising an outboard ring and an inboard ring;
   said thick door sets secured to said outboard rings; and
   said thin door sets to said inboard rings, whereby said thick and thin doors may be rotated into a nesting position.

4. A thrust reverser assembly as in claim 3 further comprising:
   said thin door sets comprising two thin door sets;
   said thick door sets comprising two thick door sets; and
   said port openings symmetrically arranged around the vertical centerline of said gas turbine exhaust duct and located substantially closer to the vertical centerline than to the horizontal centerline of said gas turbine exhaust duct.

5. A thrust reverser assembly as in claim 1 further comprising:
   each of said door sets having a space between said inner door and said outer door; and
   axial openings through each of said support rings in fluid communication with said annular flow passage and with the space between the doors of each door set.

6. A thrust reverser assembly as in claim 3 further comprising:
   axial openings through said upstream outboard ring, said upstream inboard ring, said downstream inboard ring and said downstream outboard ring; and
   said axial openings through each inboard and outboard ring contiguous when said doors are in the closed position, but noncontiguous when said doors are rotated to the open position.

7. A thrust reverser assembly for a gas turbine engine aircraft comprising:
   a wall forming a circular gas turbine exhaust duct;
   a plurality of radially extending reverser ducts located outside said wall;
   a plurality of radial port openings through said wall fluidly connecting said exhaust duct and said reverser ducts;
   a plurality of door sets located in said plurality of port openings, sized and sealable to close a port opening through said wall;
   at least one rotatable upstream support ring circumferentially surrounding said wall upstream of said port opening;
   at least one rotatable downstream support ring circumferentially surrounding said wall downstream of said port opening; and
   each of said door sets secured to said at least one upstream support ring and to said at least one downstream support ring, whereby said door sets may each be circumferentially rotated away from the port opening in which they are sealable.

* * * * *